United States Patent
Aoyagi et al.

[11] Patent Number: 5,856,899
[45] Date of Patent: Jan. 5, 1999

[54] MAGNETIC HEAD

[75] Inventors: Kinya Aoyagi; Tokuo Nakamura; Hiroshi Yamagami; Seiichi Abiko; Masahiro Iizuka; Satoshi Maki, all of Niigata-ken, Japan

[73] Assignee: Alps Electric Co., Ltd., Tokyo, Japan

[21] Appl. No.: 955,907

[22] Filed: Oct. 23, 1997

[30] Foreign Application Priority Data

Oct. 23, 1996 [JP] Japan .................. 8-280932

[51] Int. Cl.$^6$ .................. G11B 5/133; G11B 5/235
[52] U.S. Cl. .................. 360/127
[58] Field of Search .................. 360/126, 127, 360/120

[56] References Cited

U.S. PATENT DOCUMENTS

| | | | |
|---|---|---|---|
| 3,810,245 | 5/1974 | Ozawa et al. | 360/127 |
| 4,246,619 | 1/1981 | Hirai et al. | 360/125 |
| 4,316,228 | 2/1982 | Fujiwara et al. | 360/127 |
| 4,439,794 | 3/1984 | Shiroishi et al. | 360/127 |
| 4,450,494 | 5/1984 | Fujiwara et al. | 360/125 |
| 4,953,049 | 8/1990 | Okuda et al. | 360/126 |
| 5,218,500 | 6/1993 | Okuda et al. | 360/126 |
| 5,270,894 | 12/1993 | Okuda et al. | 360/126 |
| 5,278,716 | 1/1994 | Okuda et al. | 360/126 |
| 5,515,222 | 5/1996 | Kumagai et al. | 360/127 |
| 5,576,912 | 11/1996 | Mitsumata et al. | 360/127 X |

*Primary Examiner*—John H. Wolff
*Attorney, Agent, or Firm*—Brinks Hofe Gilson & Lione

[57] ABSTRACT

The magnetocrystalline anisotropic energy Kl is set to not more than 100 J/m$^3$ and the absolute value of the magnetostriction in the <100> direction, as the magnetic circuit direction, is reduced by appropriately selecting the ferrite material composition. Since the magnetocrystalline anisotropic energy Kl is small, the magnetoelastic energy largely affects the anisotropy of the crystallographic axis. The magnetoelastic energy is made negative and small in magnitude by adjusting the average coefficients of thermal expansion of the ferrite material and glass so as to apply a tensile stress around the magnetic gap of the magnetic head. The <100> direction, i.e., magnetic circuit direction, is thereby allowed to coincide with a hard axis of magnetization. As a result, the permeability of the magnetic head is improved at high-frequency bands.

6 Claims, 9 Drawing Sheets

MAGNETIC HEAD

BACKGROUND OF THE INVENTION

1. Field of the Invention

The present invention relates to a so-called β azimuth magnetic head whose magnetic-gap forming faces and tape rubbing surfaces of a single-crystal ferrite core are allowed to coincide with the (100) plane and the (110) plane, respectively, and particularly, relates to a magnetic head having improved magnetic permeability and head output in a high frequency range of not less than 10 MHz.

2. Description of the Related Art

FIG. 10 is a perspective view of a magnetic head, and FIG. 11 is an enlarged plan view of the same viewed from rubbing surfaces to be in contact with a recording medium.

A pair of core halves 1 are made of a single-crystal ferrite composed of $Fe_2O_3$, MnO, and ZnO, or a jointing material of a single ferrite and a poly-crystal ferrite. The pair of core halves 1 are joined together with a non-magnetic material interposed therebetween to form a magnetic gap G. Magnetic-gap forming faces 1a and a track width Tw' are also shown in FIG. 11.

Each of the core halves 1 has tapered faces (i.e., track width defining faces) 1b inclined with respect to the magnetic-gap forming face 1a. Glass 2 fills the region formed by the tapered faces 1b so as to join the magnetic-gap forming faces 1a of the core halves 1. The core halves 1 have coils 3 for recording and reproducing. Although the azimuthal angle of the magnetic gap G is 0 in FIG. 10, in practice, the magnetic gap G has a certain azimuthal angle clockwise or counterclockwise with respect to the magnetic circuit direction shown in FIG. 11.

Crystals of the ferrite materials have a cubic structure, and the magnetic head shown in FIG. 10 is a so-called β azimuth magnetic head whose magnetic-gap forming faces and the tape rubbing surfaces are in the crystallographic planes of the ferrite designated by (100) and (110). The crystallographic axis along the magnetic circuit direction on the tape rubbing surfaces is in the <100> direction. Rubbing surfaces of β azimuth magnetic heads must have excellent wear resistance.

The crystallographic axis <100> is an easy axis of magnetization when the magnetocrystalline anisotropic energy K1, determined by the composition of a single-crystal ferrite, is more than 0, while the crystallographic axis <100> is a hard axis of magnetization when the magnetocrystalline anisotropic energy K1 is less than 0. The closer the absolute value of the magnetocrystalline anisotropic energy K1 approaches 0, the lower the magnetic anisotropy becomes.

Conventionally, in such types of magnetic heads, the magnetocrystalline anisotropic energy K1 is generally set to a value as close as possible to 0 to achieve a higher permeability because the permeability is in inverse proportion to the magnetocrystalline anisotropic energy K1.

In addition, ferrite materials exhibit magnetostriction, and the saturation magnetostriction λS of a ferrite material as a whole is determined by its composition. Similar to the above-mentioned the magnetocrystalline anisotropic energy K1, the saturation magnetostriction λS is in inverse proportion to the permeability. Therefore, it has been considered that a higher permeability can be also achieved by setting the saturation magnetostriction λS to a value as close as possible to 0.

FIG. 3 is a ternary diagram showing compositions of a ferrite material composed of $Fe_2O_3$, MnO, and ZnO. The magnetocrystalline anisotropic energy K1 and the saturation magnetostriction λS are both near 0 in a ferrite material composed of 51 to 56 mol % of $Fe_2O_3$, 27 to 32 mol % of MnO, and 12 to 22 mol % of ZnO. These ranges correspond to the region I in the figure. Cores of conventional magnetic heads have been made of a single-crystal ferrite having a composition within the region I.

However, when a magnetic head, made of a single-crystal ferrite having a composition within the region I in which the magnetocrystalline anisotropic energy K1 and the saturation magnetostriction λS are were both near 0, had magnetic-gap forming faces 1a each having an area of not more than 300 $\mu m^2$ and a narrow track width Tw', the recording and reproducing outputs of the magnetic head were reduced at a high frequency such as several MHz to 10 MHz.

This phenomenon is attributed to the following: in the magnetic head having such small magnetic-gap forming faces 1a, the effects of the residual stress due to processing the core halves 1 and the stress caused by a difference between the coefficients of thermal expansion of the glass 2 and the ferrite are so great that the magnetoelastic energy, which is in proportion to the product of the magnetostriction λ and the stress σ, correspondingly increases; thus the permeability of the single-crystal ferrite of the magnetic-gap forming portions practically deteriorates. In addition to the above, the permeability significantly deteriorates at a high frequency because the magnetic circuit direction of the magnetic-gap forming portions becomes an easy axis of magnetization.

SUMMARY OF THE INVENTION

Given the above-described problems, it is an object of the present invention to provide a magnetic head in which, for improving the output of the magnetic head, the permeability for a high-frequency alternating-magnetic field in the magnetic circuit direction is raised by appropriately setting the magnetostriction λ of the single-crystal ferrite composing the core halves, the stress applied to the gap-forming portions, and the magnetocrystalline anisotropic energy K1.

A magnetic head of the present invention has a pair of core halves joined at magnetic-gap forming faces of the core halves so as to form a magnetic gap. Each of the magnetic-gap forming faces has an area of not more than 300 $\mu m^2$. At least gap-forming portions of the core halves are made of a single-crystal ferrite. Each of the core halves has track-width defining faces on both sides of the magnetic-gap forming face and the core halves are joined by a joining material filling regions formed by the track-width defining faces. In this magnetic head, the magnetic-gap forming faces are in the (100) plane of the single-crystal ferrite; the magnetic circuit direction perpendicular to the magnetic-gap forming faces is in the <100> direction; the magnetostriction λ<100> of the core halves in the <100> direction is negative; a tensile stress in the <100> direction caused by the difference in the coefficients of thermal expansion between the jointing material and the single-crystal ferrite is applied to the gap-forming portions of the core halves; the absolute value of the magnetostriction constant of the core halves in the <100> direction is not more than $7 \times 10^{-6}$; the ratio of the average coefficient of thermal expansion of the jointing material to that of the single-crystal ferrite is in a range of from 0.85 to 1 at 100° C. to 300° C.; and the single-crystal ferrite is composed of 51.5 to 54.5 mol % of $Fe_2O_3$, 23 to 26.5 mol % of MnO, and 21 to 23.5 mol % of ZnO.

By setting the ratio of the average coefficient of thermal expansion of the jointing material to that of the single-crystal ferrite in the above range, the tensile stress applied to the core halves can be set in an appropriate positive range.

Furthermore, the absolute value of the magnetocrystalline anisotropic energy Kl of the single-crystal ferrite is preferably not more than 100 J/m³.

Moreover, preferably, the angle made by one track-width defining face of one of the core halves and the opposing track-width defining face of another core half is in a range of from 100° to 180° and the angle made by one track-width defining face of each of the core halves and the <100> direction of the single-crystal ferrite is not more than 50°.

According to the present invention, in a magnetic head which has a small magnetic gap formed by magnetic-gap forming faces each having an area of not more than 300 μm² and which performs recording and reproducing at a high frequency, the outputs of the magnetic head are improved by increasing the practical permeability in gap-forming portions. In particular, the present invention is suitable for so-called β azimuth magnetic heads whose magnetic-gap forming faces and tape rubbing surfaces of single-crystal ferrite core halves are in the crystallographic planes of the ferrite designated by (100) and (110), respectively. By designating the tape rubbing surfaces to the (110) plane, it is possible to improve the wear resistance of the tape rubbing surfaces and increase the permeability for a high-frequency alternating-magnetic field.

In a magnetic head of the present invention which has magnetic-gap forming faces each having an area of not more than 300 μm², the residual stress due to processing the core halves 1 and the stress caused by a difference between the coefficients of thermal expansion of glass 2 and the ferrite have large effects on the gap forming portions. Therefore, according to the present invention, a force is applied such that the magnetostriction λ<100> in the <100> direction (i.e., the magnetic circuit direction) of the single-crystal ferrite is set to a negative value, and the stress σ in the <100> direction of the single-crystal ferrite of the gap forming portions is set to a positive value (i.e., tensile stress) so as to achieve a negative magnetoelastic energy which is in proportion to the product of the magnetostriction X<100> and the stress σ. Thus, due to such magnetoelastic energy, the <100> direction (i.e., the magnetic circuit direction) becomes a hard axis of magnetization and the direction perpendicular to the magnetic circuit direction becomes an easy axis of magnetization.

It was confirmed that when an alternating-magnetic field of a high-frequency such as 10 MHz passed through a magnetic core, the permeability could be raised by allowing the magnetic circuit direction to approach? to a hard axis of magnetization to some extent. This phenomenon is attributed to the following: when a high-frequency alternating-magnetic field passes through a magnetic core, the effect of so-called spin-rotation magnetization on permeability is more dominant than the effect on permeability due to changes in the magnetic domain walls. In other words, changes occurring in a magnetic field inside a ferrite due to an applied magnetic field which varies with time include: changes due to the movement of the magnetic domain walls in the ferrite, by which movement the magnetization direction is allowed to coincide with the magnetic field direction; and the spin-rotation magnetization, in which the magnetization direction rotates between the magnetic circuit direction and the direction perpendicular to the magnetic circuit direction while following the variation of the applied magnetic field with time. Compared with the movement of the magnetic domain walls, the spin-rotation magnetization plays a larger role in allowing a high-frequency alternating-magnetic field to more readily pass through a magnetic core. To designate the magnetic circuit direction to a hard axis of magnetization is supposed to be effective in increasing the permeability by the spin-rotation magnetization.

According to the present invention, the magnetic circuit direction is allowed to coincide with a hard axis of magnetization by utilizing the influence of the magnetoelastic energy on the gap forming portions of the core halves. However, in addition to the magnetoelastic energy, the magnetocrystalline anisotropic energy Kl largely affects the direction of the axis of magnetization in the single-crystal ferrite. Therefore, it is necessary for increasing the influence of the magnetoelastic energy to set the absolute value of the magnetocrystalline anisotropic energy Kl to a value as close as possible to 0.

Accordingly, in the present invention, a ferrite material having a composition within region II shown in FIG. 3 is employed so as to set the absolute value of the magnetocrystalline anisotropic energy of the single-crystal ferrite to not more than 100 J/m3 and to set the magnetostriction λ<100> in the <100> direction to a negative value.

Furthermore, for applying an appropriate tensile stress σ in the <100> direction of the single-crystal ferrite in the gap forming portions, the angles of the tapered faces is set within an optimum range.

Moreover, in a so-called MIG type magnetic head, in which a metallic film made of a high magnetic permeability material is formed on magnetic-gap forming faces of single-crystal ferrite core halves, tensile stress σ in the <100> direction can be applied to the single-crystal ferrite due to a difference in the coefficients of thermal expansion of the metallic film and the single-crystal ferrite. In this case, an appropriate tensile stress σ in the <100> direction can be applied to the single-crystal ferrite by setting the coefficient of thermal expansion of the metallic film to a value lower than that of the single-crystal ferrite by $5 \times 10^{-7}$ (/°C.) or more.

DETAILED DESCRIPTION OF THE PREFERRED EMBODIMENT

The present invention will be better understood from the following preferred embodiments taken in conjunction with the accompanying drawings.

Figure 1:
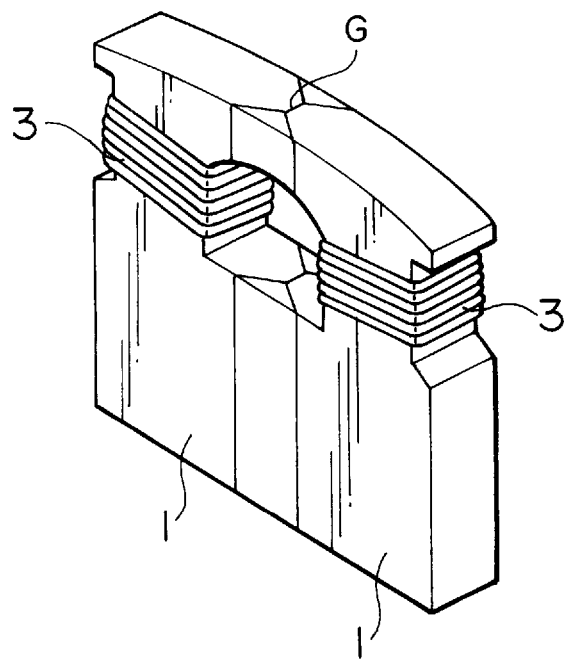
FIG. 1 is a perspective view of a β azimuth magnetic head.
Figure 2:
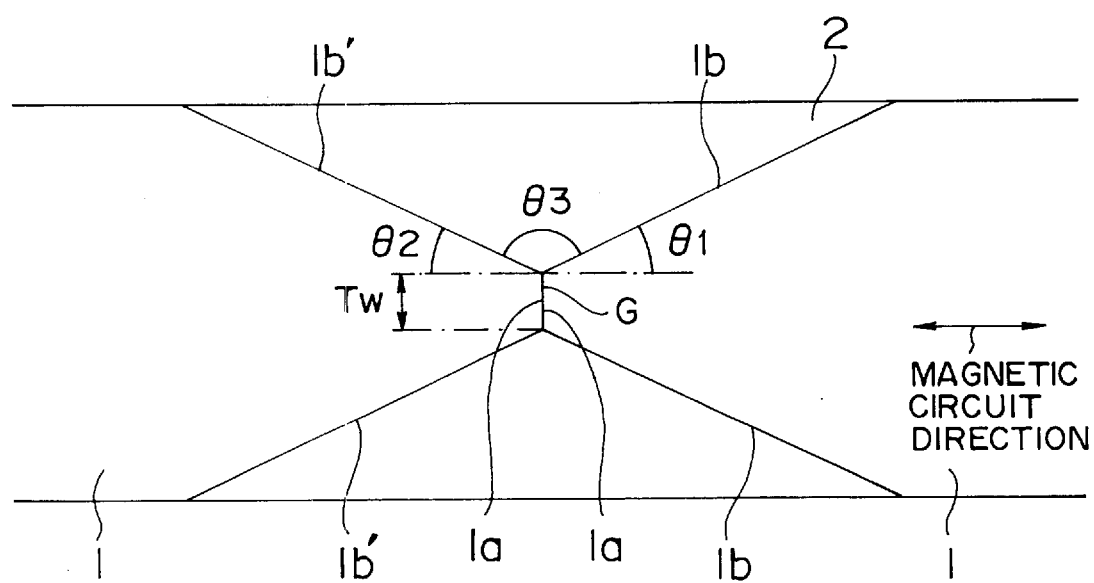
FIG. 2 is an enlarged plan view of a magnetic gap and its surroundings incorporated into the present invention viewed from rubbing surfaces.

FIG. 1 is a perspective view of a β azimuth magnetic head incorporated in the present invention, and FIG. 2 is an enlarged plan view of the same viewed from rubbing surfaces to be in contact with a recording medium.

A pair of core halves 1 shown in FIGS. 1 and 2 are made of: a Mn—Zn single-crystal ferrite prepared by mixing $Fe_2O_3$, MnO, and ZnO according to a predetermined composition followed by sintering; or a jointing material of a single ferrite and a poly-crystal ferrite with at least gap-forming portions being formed by a single ferrite.

The pair of core halves 1 are joined together with a non-magnetic material interposed therebetween to form a magnetic gap G. A so-called MIG type magnetic head having a metallic film made of a high magnetic permeability material (e.g., iron type microcrystalline material) may be also used. According to the magnetic head of the present invention, the area of each of the magnetic-gap forming faces 1a is not more than 300 $\mu m^2$ and the track width Tw is narrow so as to achieve high-density recording at small track pitch on magnetic tapes.

In the β azimuth magnetic head, the magnetic-gap forming faces and the tape rubbing surfaces are in the crystallographic planes of the ferrite designated by (100) and (110), respectively. The crystallographic axis along the magnetic circuit direction is in the <100> direction. Since the rubbing surfaces of β azimuth magnetic heads have excellent wear resistance, the relative speed of the magnetic head to recording media can be improved so that high-frequency signals can be recorded.

Each of the core halves 1 has tapered faces (track width defining faces) 1b inclined with respect to both the magnetic-gap forming face 1a and the magnetic circuit direction. Glass 2 fills the region formed by the tapered faces 1b so as to join the magnetic-gap forming faces 1a of the core halves 1. Coils 3 for recording and reproducing are provided for the magnetic core.

Figure 3:
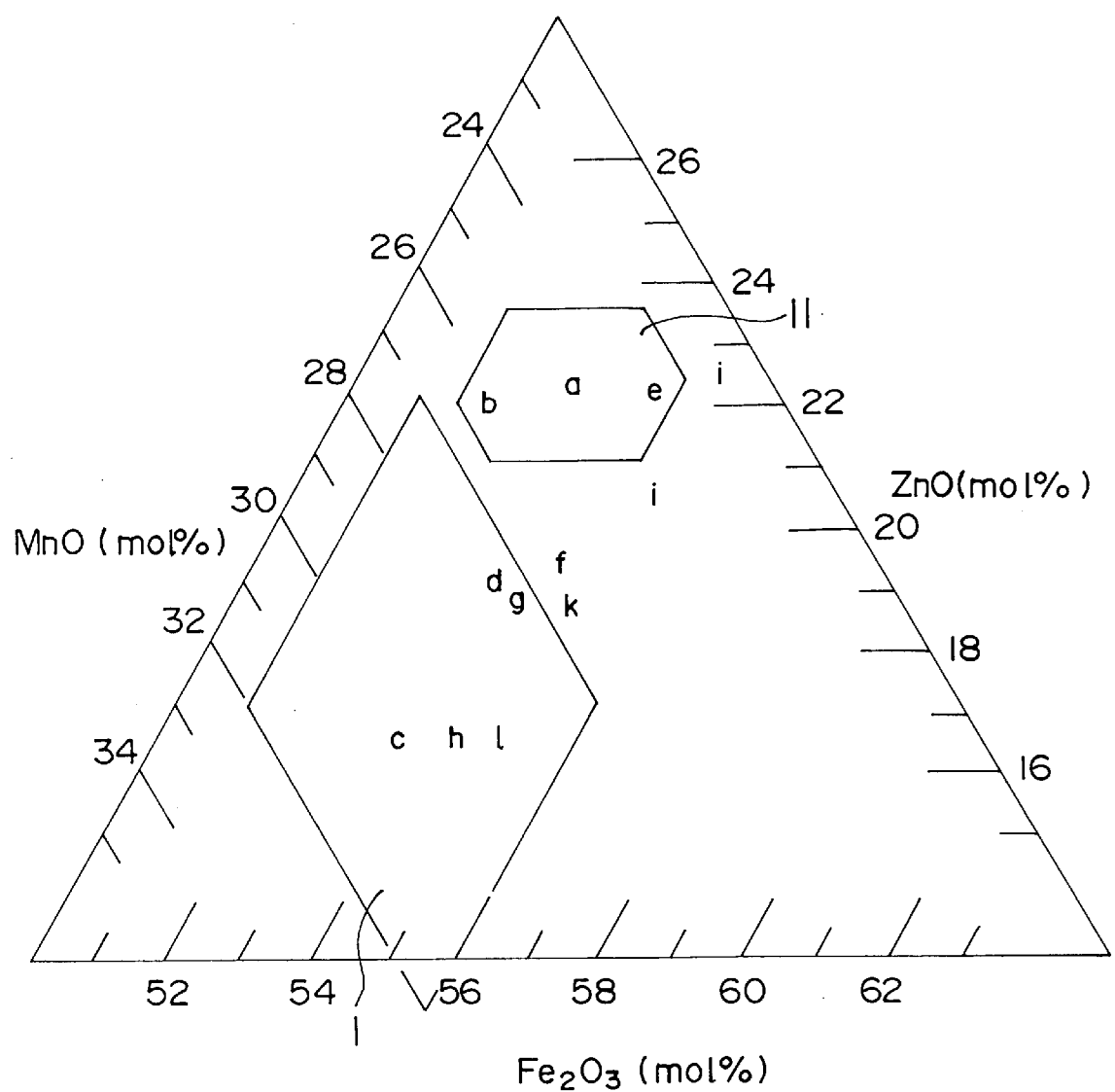
FIG. 3 is a ternary diagram of a single-crystal ferrite composed of $Fe_2O_3$, MnO, and ZnO.

A single-crystal ferrite used as the core halves 1 is composed of 51.5 to 54.5 mol % of $Fe_2O_3$, 23 to 26.5 mol % of MnO, and 21 to 23.5 mol % of ZnO, which range corresponds to region II in the ternary diagram of FIG. 3.

In a single-crystal ferrite, the magnetocrystalline anisotropic energy Kl, the magnetostriction λ<100> in the <100> direction, and the coefficient of thermal expansion $\alpha_{ferrite}$ are determined by selecting the composition from region II shown in FIG. 3.

A single-crystal ferrite having a composition within region II of FIG. 3 has a small absolute value of the magnetocrystalline anisotropic energy Kl of not more than 100 J/m³ and a small negative magnetostriction λ<100> with the magnetostriction constant of not more than 7×10⁻⁷.

Since the glass 2 has an average coefficient of thermal expansion $\alpha_{glass}$ of $100 \times 10^{-7}$ to $115 \times 10^{-7}$, the glass/ferrite ratio of the average coefficients of thermal expansion ($\alpha_{glass}/\alpha_{ferrite}$) satisfies $0.85 < \alpha_{glass}/\alpha_{ferrite} < 1$ so that a small tensile stress (i.e., positive stress σ) in the magnetic circuit direction (i.e., <100> direction) is applied to the core halves 1 around the magnetic gap G.

According to a magnetic head of the present invention, a positive stress σ is applied in the <100> direction of the tape rubbing surfaces due to a difference between the coefficients of thermal expansion of the ferrite and the glass 2. In addition, since the composition of the single-crystal ferrite is within region II of FIG. 3, the magnetostriction λ<100 > is set to a negative value. Therefore, the magnetoelastic energy, which is in proportion to the product of the magnetostriction λ and the stress σ (i.e., 3/2.λ<100>.σ) is rendered negative.

When the magnetoelastic energy is positive, the <100> direction of the crystallographic axis of the single-crystal ferrite becomes an easy axis of magnetization, meanwhile if the magnetoelastic energy is negative, the <100> direction of crystallographic axis is a hard axis of magnetization. The closer the absolute value of the magnetoelastic energy is to 0, the lower the anisotropy.

As is mentioned above, according to the present invention, the <100> direction (i.e., the magnetic circuit direction) is set to a hard axis of magnetization by applying a tensile stress in the <100> direction around the magnetic gap G so as to achieve a negative magnetoelastic energy. Furthermore, the absolute value of the magnetoelastic energy is reduced because the absolute value of the magnetostriction λ<100> is small in a single-crystal ferrite having a composition within region II of FIG. 3 and the glass/ferrite ratio of the coefficients of thermal expansion $\alpha_{glass}/\alpha_{ferrite}$ is set to an appropriate range, i.e., $0.85 < \alpha_{glass}/\alpha_{ferrite} < 1$. In other words, around the magnetic gap, the magnetoelastic energy is set to allow the magnetic circuit direction (i.e., <100> direction) to coincide with a hard axis of magnetization.

However, in addition to the magnetoelastic energy, the magnetocrystalline anisotropic energy Kl determined by the composition of a single-crystal ferrite largely affects the anisotropy. From the viewpoint of the magnetocrystalline anisotropic energy Kl alone, the <100> direction is allowed to coincide with an easy axis of magnetization and a hard axis of magnetization when the magnetocrystalline anisotropic energy Kl is positive and negative, respectively. Therefore, the magnetization direction in the magnetic head is determined by an apparent anisotropic energy Ea defined by the magnetocrystalline anisotropic energy Kl and the magnetoelastic energy (i.e., 3/2.σ.λ<100>) as follows:

Apparent anisotropic energy=(Magnetocrystalline anisotropic energy)−(Magnetoelastic energy)

Since magnetic heads of the present invention have small magnetic-gap forming faces each having an area of not more than 300 $\mu m^2$, the anisotropy due to the magnetoelastic energy dominantly affects the anisotropy of the single-crystal ferrite around the magnetic gap. However, the magnetocrystalline anisotropic energy Kl also has some effects. Thus, according to the present invention, the absolute value of the magnetocrystalline anisotropic energy is set to not more than 100 J/m³ for reducing the effects of the magnetocrystalline anisotropic energy Kl on the anisotropy of the single-crystal ferrite around the magnetic gap, in addition to that the absolute value of the magnetoelastic energy is set in an appropriate range by reducing the absolute value of the magnetostriction λ<100> and rendering the glass/ferrite ratio of the coefficients of thermal expansion ($\alpha_{glass}/\alpha_{ferrite}$) in a certain range.

Magnetic heads according to the present invention are applicable to DDS (digital data storage) and the like, and used at high-frequency bands of approximately from several MHz to 10 MHz or more. At such high-frequency bands, the spin-rotation magnetization readily occurs by setting the crystallographic axis <100> to a hard axis of magnetization; the permeability and head output can be thereby increased.

Furthermore, the tensile stress in the <100> direction around the magnetic gap of the core halves can be arranged in an optimum range by setting the angles $\theta_1$ and $\theta_2$, made between the crystallographic axis <100> and the tapered faces 1b of the core halves 1, to not more than 50°, and setting the angle $\theta_3$ made between one tapered face 1b of one core halve 1 and the opposing tapered face 1b of the other core halve 1 to 100° to 180°. As a result, a high permeability can be reliably achieved at high frequency bands.

Examples

Examples of β azimuth magnetic heads incorporated in the present invention will be explained below:

All experiments were conducted according to the following conditions (i) to (iii):

(i) Magnetic Head
   Track width Tw: 12 μm
   Magnetic gap depth: 14 to 17 μm
   Magnetic gap length: 0.2 μm
   Azimuth angle: 20°

(ii) Recording Medium
   MP tape for Hi8 (commercially available)
   Relative speed: 6.26 m/s
   Recording frequency: 9.4 MHz (iii) The head output was measured such that after recording signals on the tape by a magnetic head, the reproduction output of the magnetic head was measured.

Twelve types of magnetic heads composed of respective single-crystal ferrite samples a to l shown in Table 1 were fabricated, and then, subjected to measurements of the magnetostriction λ<100>, the magnetocrystalline anisotropic energy Kl, and head output. Table 1 also shows the results. In each of the twelve magnetic heads, the angle $\theta_3$ shown in FIG. 2 is set to 105° and the glass/ferrite ratio of the average coefficients of thermal expansion ($\alpha_{glass}/\alpha_{ferrite}$) is arranged in a range of from 0.95 to 1 so as to generate a small tensile stress.

TABLE 1

| Sample | Ferrite composition (mol %) | | | <λ 100> (× 10⁻⁶) | Kl (J/m³) | Head output (dB) |
| --- | --- | --- | --- | --- | --- | --- |
| | Fe₂O₃ | MnO | ZnO | | | |
| a | 53.1 | 24.7 | 22.2 | −4.7 | 20 | 2.7 |
| b | 52.2 | 26.0 | 21.8 | −5.8 | −20 | 2.6 |
| c | 53.5 | 30.1 | 16.4 | −8.3 | −10 | 0.8 |
| d | 53.6 | 27.5 | 18.9 | −10.0 | 20 | 0.0 |
| e | 54.2 | 23.7 | 22.1 | −6.8 | 60 | 2.3 |
| f | 54.2 | 26.4 | 19.4 | −8.0 | 140 | 0.3 |
| g | 53.9 | 27.2 | 18.9 | −10.0 | 120 | −0.6 |
| h | 54.2 | 29.3 | 16.5 | −11.0 | 140 | −0.7 |
| i | 55.0 | 22.4 | 22.6 | −4.7 | 190 | 0.6 |
| j | 55.0 | 24.4 | 20.6 | −5.8 | 200 | 0.5 |
| k | 54.7 | 26.5 | 18.8 | −7.3 | 210 | 0.1 |
| l | 54.8 | 28.7 | 16.5 | −7.5 | 220 | −0.6 |

Figure 4:
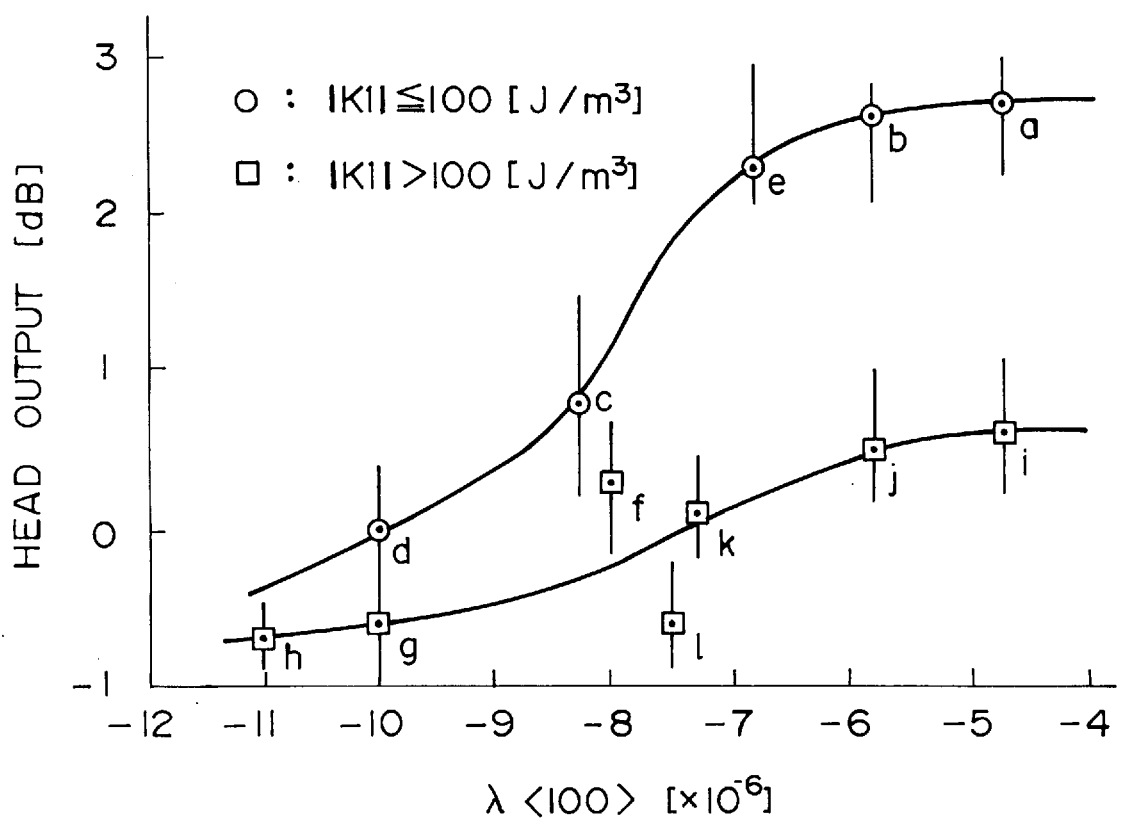
FIG. 4 is a graph showing the relationship between the magnetostriction λ<100> and the head output of twelve types of magnetic heads composed of respective ferrite materials of samples a to l shown in Table 1.

FIG. 4 is a graph showing the relationship between the magnetostriction λ<100> in the <100> direction of the single-crystal ferrites and the head output (dB). The upper line indicates the results of the magnetic heads composed of respective samples a to e each having an absolute value of the magnetocrystalline anisotropic energy Kl of not more than 100 J/m³, and the lower line represents the results of the magnetic heads composed of respective samples f to l each having an absolute value of the magnetocrystalline anisotropic energy Kl of not less than 100 J/m³. The head output (dB) shown in Table 1 and FIG. 4 is represented by relative values with the head output of the sample d being 0 dB.

As is shown in FIG. 4, the head output increases when the absolute value of the magnetocrystalline anisotropic energy Kl is not more than 100 J/m³. This phenomenon is attributed to the following: the magnetocrystalline anisotropic energy Kl is so low in the samples a to e that it scarcely affects the anisotropy of the crystallographic axis; as a result, the anisotropy largely depends on the small negative magnetoelastic energy which is determined by the negative magnetostriction λ<100> and low tensile stress. The <100> direction, i.e., the magnetic circuit direction, is thereby allowed to coincide with a hard axis of magnetization so that the permeability at a high-frequency band is raised due to the spin-rotation magnetization, resulting in a higher head output.

Concerning the lower line shown in FIG. 4, similarly to the upper line, it is regarded that with a decrease in the absolute value of the magnetostriction λ<100>, the absolute value of the magnetoelastic energy is reduced, and correspondingly, the head output increases. However, even when the absolute value of the magnetoelastic energy is low, the anisotropy of the crystallographic axis is supposed to depend on not only the magnetoelastic energy but also the apparent magnetocrystalline anisotropic energy Ea obtained by subtracting the magnetoelastic energy from the magnetocrystalline anisotropic energy Kl, if the absolute value of the magnetocrystalline anisotropic energy Kl is not less than 100 J/m³. Therefore, the samples f to l have lower head output than the samples a to e having the absolute value of the magnetocrystalline anisotropic energy Kl of not more than 100 J/m³.

The samples a, b, and e have compositions within region II in the ferrite ternary diagram of FIG. 3, and exhibit particularly low absolute values of the magnetocrystalline anisotropic energy Kl and the magnetostriction λ<100>. As is apparent from Table 1, the magnetic heads composed of the respective samples a, b, and e achieve high output at a high-frequency band, which is attributed to the following: although the absolute values for both the magnetocrystalline anisotropic energy Kl and the magnetostriction λ<100> are low in the samples a, b, and e each within region II of FIG. 3, the anisotropy is dominantly due to the magnetoelastic energy, determined by the magnetostriction λ<100> and the stress, because the area of each magnetic-gap forming face is not more than 300 μm²; thus the <100> direction, i.e., the magnetic circuit direction, is allowed to almost coincide with a hard axis of magnetization.

Figure 5:
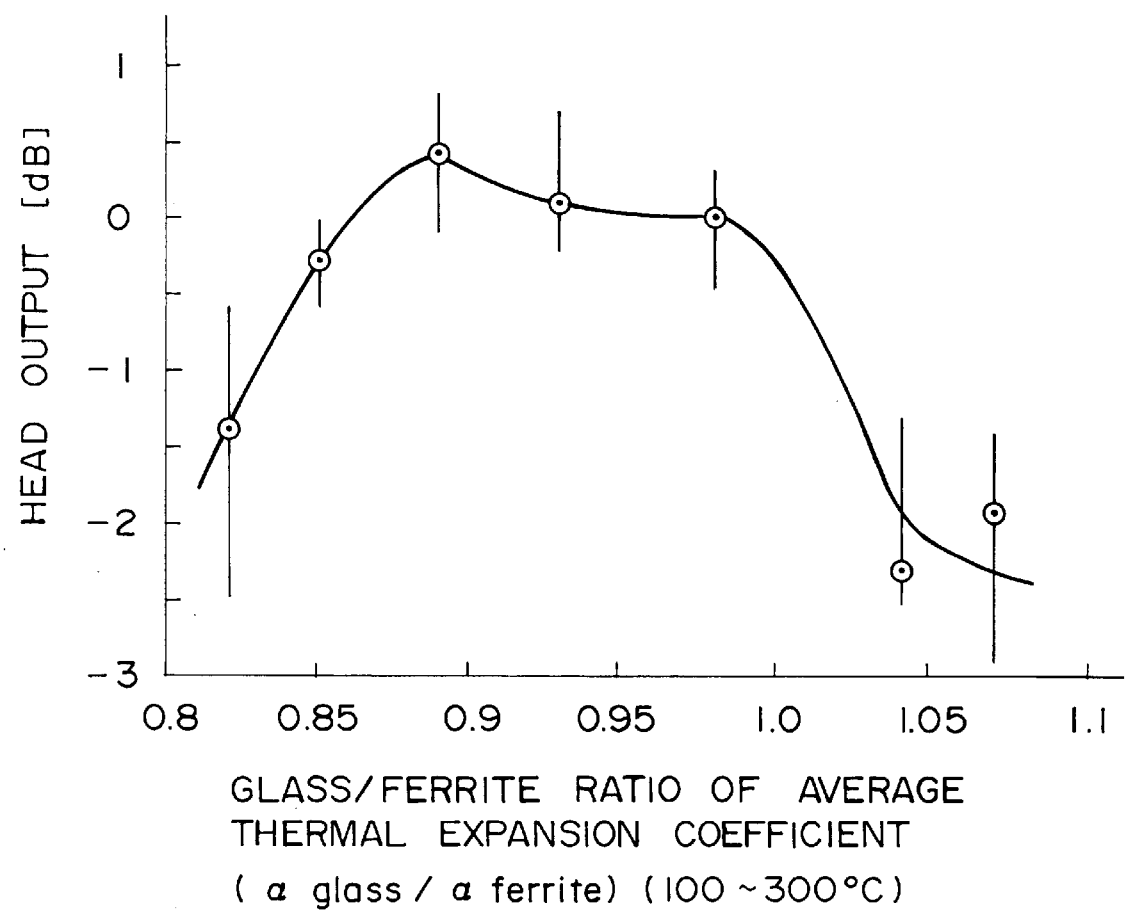
FIG. 5 is a graph showing the relationship between the head output and the glass/ferrite ratio of average coefficients of thermal expansion ($\alpha_{glass}/\alpha_{ferrite}$) of seven types of magnetic heads composed of the ferrite material of sample a shown in Table 1 and glass whose average coefficient of thermal expansion is different from each other.

FIG. 5 is a graph showing the relationship between the head output and the average glass/ferrite ratio of the coefficients of thermal expansion ($\alpha_{glass}/\alpha_{ferrite}$) at 100° to 300° C. The head output (dB) shown in FIG. 4 is represented by relative values with the head output of a magnetic head having a glass/ferrite ratio of average coefficients of thermal expansion of 0.98 being 0 dB.

Seven types of magnetic heads composed of respective glasses of different average coefficients of thermal expansion were prepared for head output measurement. All of these seven types of magnetic heads employed the same ferrite composition as that of the sample a and their angle $\theta_3$ shown in FIG. 2 was set to 105°.

As is shown in FIG. 5, the head output is raised when the glass/ferrite ratio of average coefficients of thermal expansion ($\alpha_{glass}/\alpha_{ferrite}$) is in a range of from 0.85 to 1 with the average coefficient of thermal expansion of glass $\alpha_{glass}$ being $100 \times 10^{-7}$ to $115 \times 10^{-7}$ (/°C.).

It is supposed that the increases in the head output is due to the following: Within the above range, a small and positive tensile stress is applied around the magnetic gap G in the <100> direction, and the magnetostriction $\lambda$<100> of the sample a is negative and small in magnitude, as is shown in Table 1. Thus, the magnetoelastic energy becomes negative and small in magnitude. Furthermore, since the absolute value of the magnetocrystalline anisotropic energy Kl is small, the <100> direction, i.e., the magnetic circuit direction, is readily allowed to coincide with a hard axis of magnetization so that the spin-rotation magnetization easily occurs, resulting in a higher head output.

When the glass/ferrite ratio of the coefficients of thermal expansion ($\alpha_{glass}/\alpha_{ferrite}$) is less than 0.85, the absolute value of the magnetoelastic energy is raised such that the magnetic anisotropy of the crystallographic axis strongly increases and the spin-rotation magnetization cannot readily occur, resulting in a decreased head output.

When the glass/ferrite ratio of average coefficients of thermal expansion ($\alpha_{glass}/\alpha_{ferrite}$) is more than 1, the magnetoelastic energy becomes positive and allows the <100> direction to coincide with an easy axis of magnetization. Thus, the spin-rotation magnetization cannot readily occurs, resulting in decreases in the head output and the permeability.

Six types of magnetic heads were fabricated such that the angle $\theta_1$, made between the tapered face 1b of the right-side core half 1 and the <100> direction (i.e., the magnetic circuit direction), varied as is shown in FIGS. 7A to 7F, while the angle $\theta_2$ made between the tapered face 1b of the left-side core half 1 and the <100> direction is set to 0 and the ridgeline 1b' of the left-side core half 1 is perpendicular to the magnetic gap G. The angle $\theta_1$ was set to 0°, 15°, 30°, 45°, 60°, and 90° in FIGS. 7A, 7B, 7C, 7D, 7E, and 7F, respectively, and the head output of each of the magnetic heads was measured. All of these six types of magnetic heads employed the same ferrite composition as that of the sample a and the average coefficient of thermal expansion of glass is almost the same as that of the ferrite.

Figure 6:
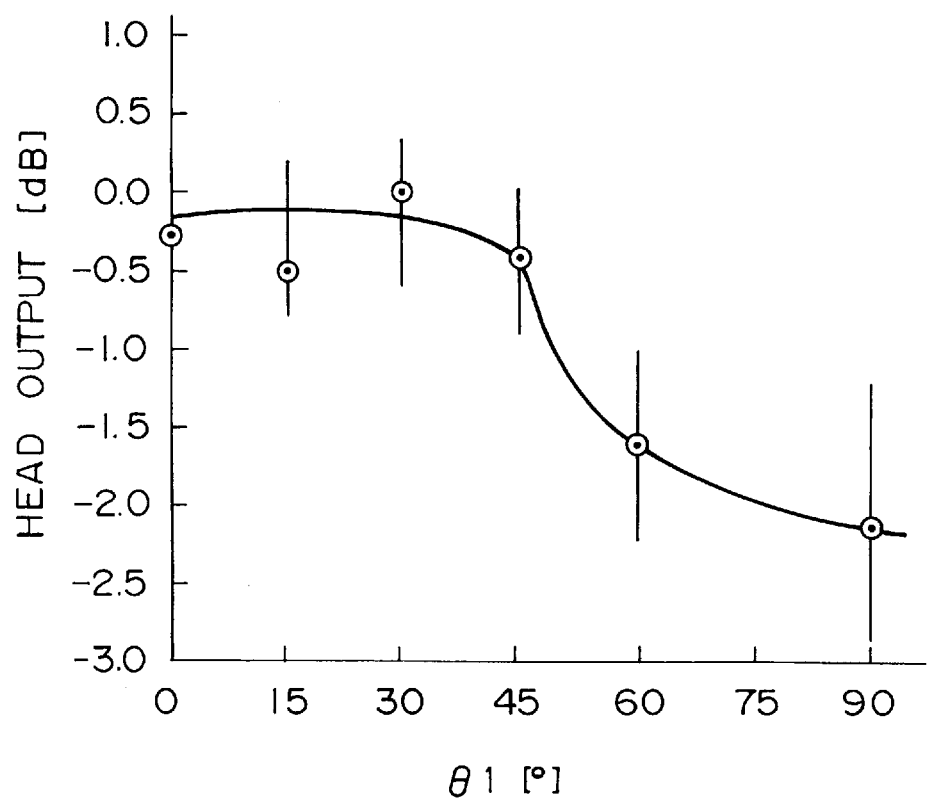
FIG. 6 is a graph showing the relationship between the head output and the angle $\theta_1$ of six types of magnetic heads of FIGS. 7A to 7F each composed of the ferrite material of sample a shown in Table 1.
Figure 7A:
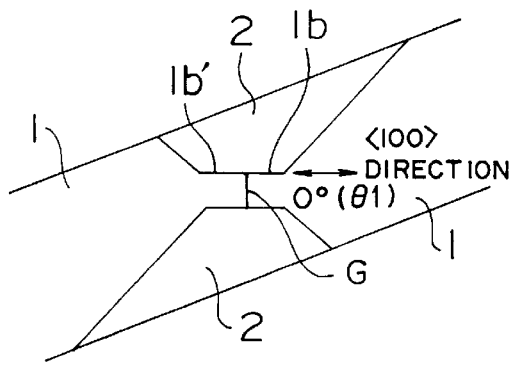
FIGS. 7A to 7F show the angle $\theta_1$ set to 0°, 15°, 30°, 45°, 60°, and 90°, respectively.
Figure 7B:
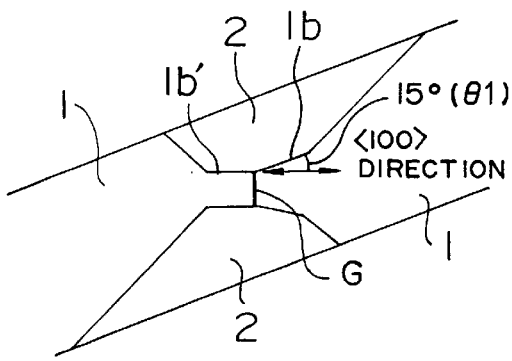
Figure 7C:
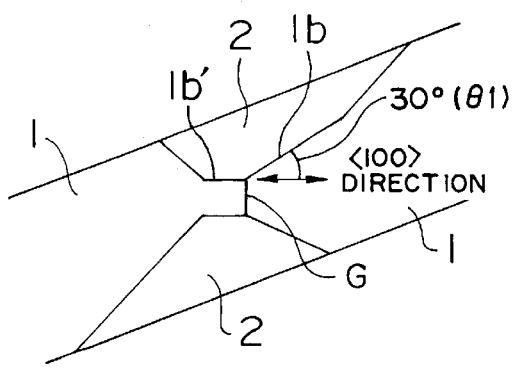
Figure 7D:
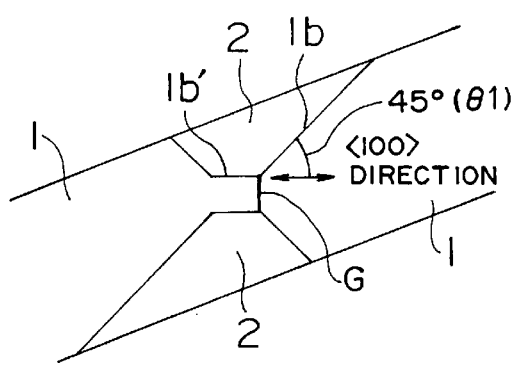
Figure 7E:
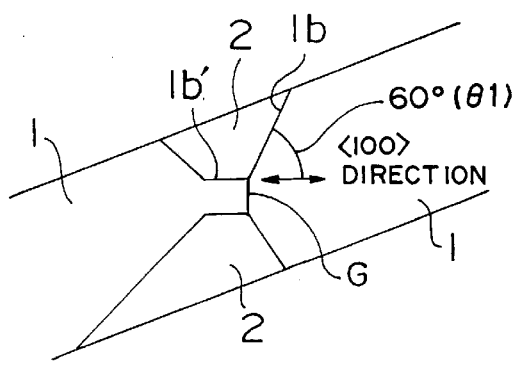
Figure 7F:
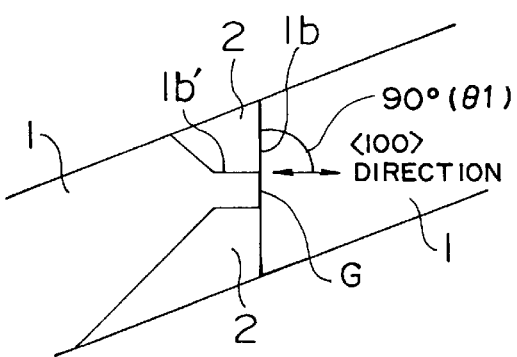

FIG. 6 is a graph showing the relationship between the head output and the angle $\theta_1$ of the magnetic heads of FIGS. 7A to 7F. The head output (dB) shown in FIGS. 7A to 7F is represented by relative values with the head output of the magnetic head of FIG. 7C ($\theta_1=0$) being 0 dB.

As is shown in FIG. 6, the head output is raised when the angle $\theta_1$ is in a range of from 0° to 50°. It is supposed that such increases in the head output are due to the following: Within the above range, the tensile stress $\sigma$ caused by the difference in the coefficients of thermal expansion between the core halves and the glass is effectively applied to the core halves in the <100> direction; thus with the negative magnetostriction $\lambda$<100>, the magnetoelastic energy is readily made negative. It is supposed that the same results as the above can be obtained when the angle $\theta_2$, made between the tapered face 1b of the left-side core half 1 and the <100> direction, varies while the angle $\theta_1$ is set to 0. Therefore, the head output increases when the angle $\theta_2$ is in a range of 0° to 50°.

Six types of magnetic heads were fabricated such that the angle $\theta_3$, made between one tapered face 1b of one core halve 1 and the opposing tapered face 1b of the other core halve 1, varied as is shown in FIGS. 9A to 9F. The angle $\theta_3$ was set to 60°, 75°, 90°, 105°, 120°, and 180° in FIGS. 9A, 9B, 9C, 9D, 9E, and 9F, respectively, and the head output of each of the magnetic heads was measured. All of these six types of magnetic heads employed the same ferrite composition as that of the sample a and the average coefficient of thermal expansion of glass is almost the same as that of the ferrite.

Figure 8:
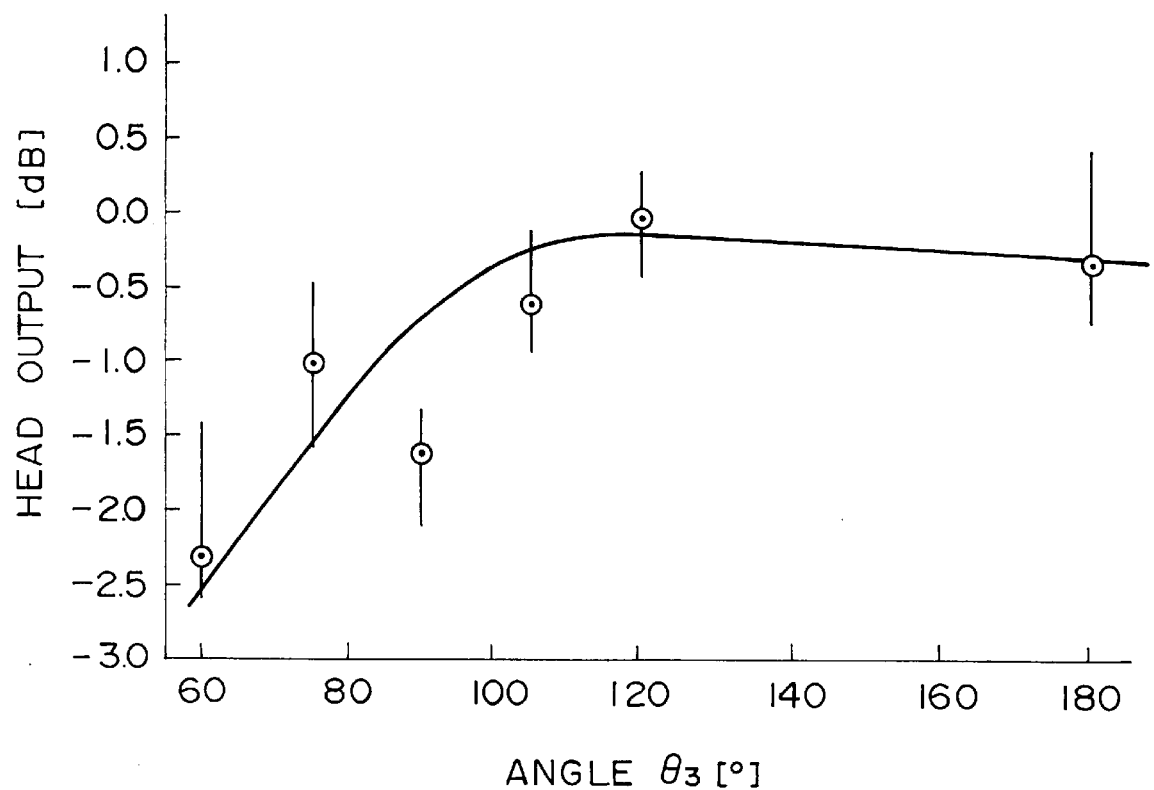
FIG. 8 is a graph showing the relationship between the head output and the angle $\theta_3$ of six types of magnetic heads of FIGS. 9A to 9F each composed of the ferrite material of sample a shown in Table 1.
Figure 9A:
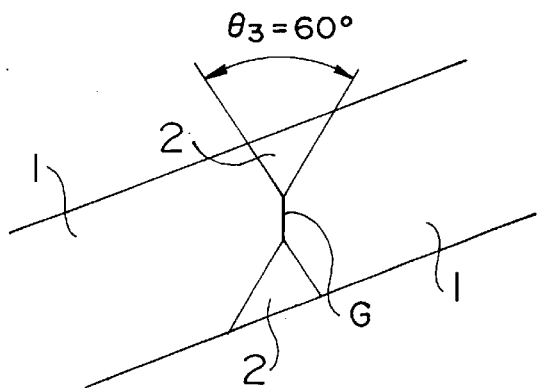
FIGS. 9A to 9F show the angle $\theta_3$ set to 60°, 75°, 90°, 105°, 120°, and 180°, respectively.
Figure 9B:
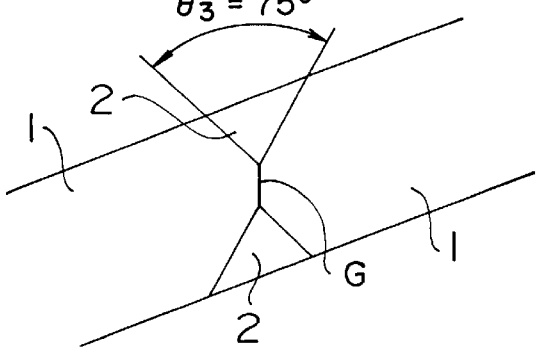
Figure 9C:
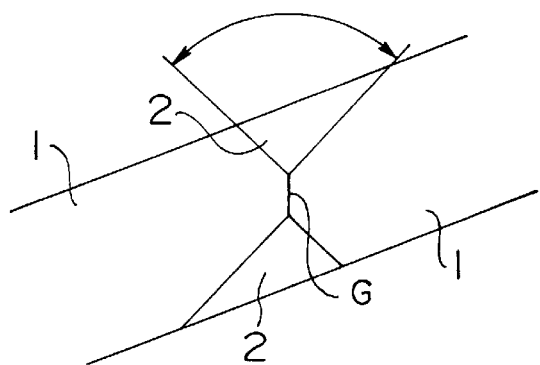
Figure 9D:
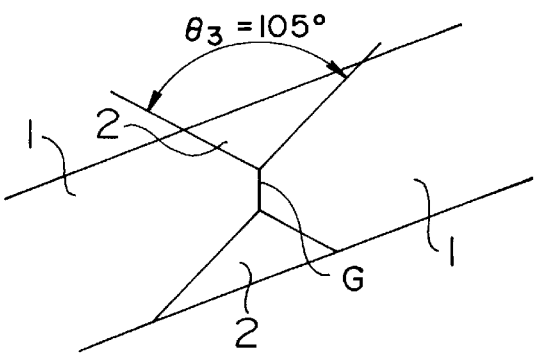
Figure 9E:
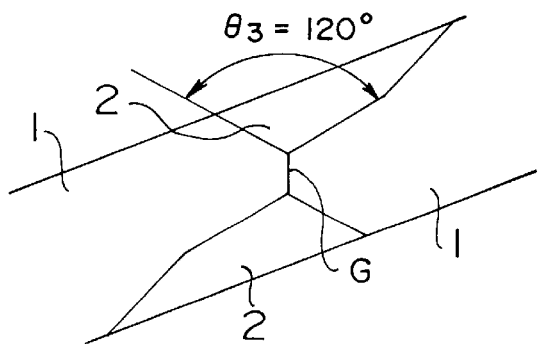
Figure 9F:
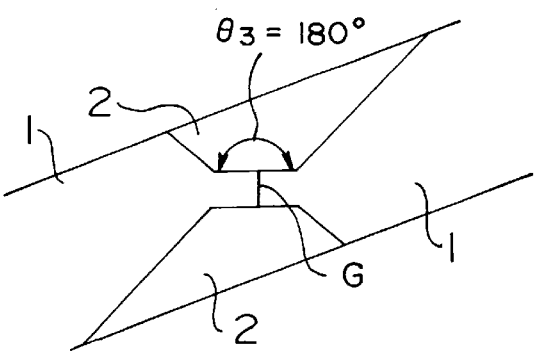
Figure 10:
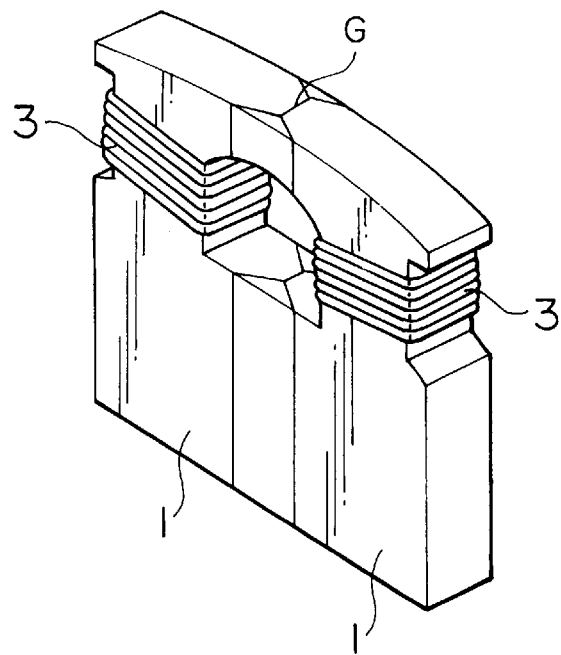
FIG. 10 is a perspective view of a β azimuth magnetic head of prior art.
Figure 11:
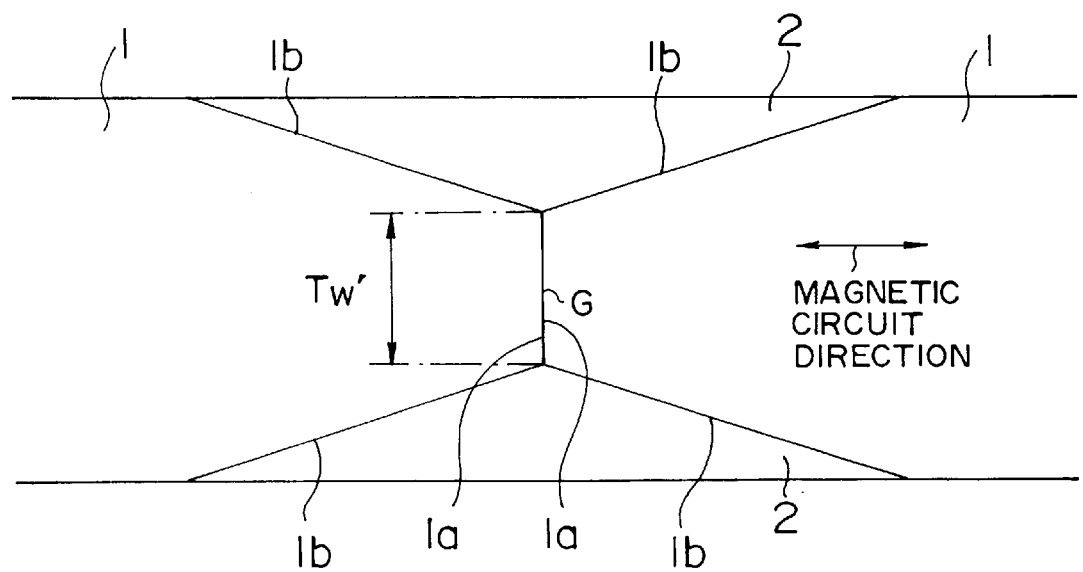
FIG. 11 is an enlarged plan view of the magnetic gap and its surroundings of prior art viewed from rubbing surfaces.

FIG. 8 is a graph showing the relationship between the head output and the angle $\theta_3$ of the magnetic heads of FIGS. 9A to 9F. The head output (dB) shown in FIGS. 9A to 9F is represented by relative values with the head output of a magnetic head of FIG. 9E ($\theta_3=120°$) being 0 dB.

As is shown in FIG. 8, the head output is raised when the angle $\theta_3$ is in a range of from 100° to 180°. It is supposed that such increases in the head output are due to the following: as is apparent from FIG. 9, within the above range, the volume of the glass 2 increases and the angles $\theta_1$ and $\theta_2$ decrease with a rise in the angle $\theta_3$; therefore, due to the difference in the coefficients of thermal expansion of the core halves and the glass, tensile stress is readily applied to the core halves in the <100> direction.

It is understood from the above results that a higher head output can be obtained by setting the angles $\theta_1$ and $\theta_2$ to 0° to 50° and setting the angle $\theta_3$ to 100° to 180°.

According to the present invention, a so-called β azimuth magnetic head, whose magnetic-gap forming faces and tape rubbing surfaces of single-crystal ferrite core halves are in the planes designated by (100) and (110), respectively, can have both the magnetocrystalline anisotropic energy Kl and the magnetostriction of the crystallographic axis <100> close to 0 by employing a ferrite material composed of 51.5 to 54.5 mol % of $Fe_2O_3$, 23 to 26.5 mol % of MnO, and 21 to 23.5 mol % of ZnO.

Particularly, in magnetic heads which have smaller gap-forming areas and which are used at high-frequency bands, a tensile stress is applied around the magnetic gap so as to render the magnetoelastic energy to be a small negative value. The crystallographic axis <100> is thereby made closer to a hard axis of magnetization. Thus, the spin-rotation magnetization readily occurs, resulting in increases in the head output and the permeability.

What is claimed is:

1. A magnetic head comprising a pair of core halves, said core halves being joined at magnetic-gap forming faces of said core halves so as to form a magnetic gap, each of said magnetic-gap forming faces having an area of not more than 300 $\mu m^2$, at least gap-forming portions of said core halves being made of a single-crystal ferrite, each of said core halves comprising track-width defining faces on both sides of said magnetic-gap forming face, said core halves being joined by a joining material filling regions formed by said track-width defining faces, wherein said magnetic-gap forming faces are in the (100) plane of said single-crystal ferrite; the magnetic circuit direction perpendicular to said magnetic-gap forming faces is in the <100> direction; the magnetostriction $\lambda$<100> of said core halves in said <100> direction is negative; a tensile stress in said <100> direction caused by the difference in the coefficients of thermal expansion between said joining material and said single-crystal ferrite is applied to said gap-forming portions of said core halves; the absolute value of the magnetostriction constant of said core halves in said <100> direction is not more than $7 \times 10^{-6}$; the ratio of the average coefficient of thermal expansion of said joining material to that of said single-crystal ferrite is in a range of from 0.85 to 1 at 100° C. to 300° C.; and said single-crystal ferrite is composed of 51.5 to 54.5 mol % of $Fe_2O_3$, 23 to 26.5 mol % of MnO, and 21 to 23.5 mol % of ZnO.

2. A magnetic head as set forth in claim 1, wherein the absolute value of the magnetocrystalline anisotropic energy K1 of said single-crystal ferrite is not more than 100 $J/m^3$.

3. A magnetic head as set forth in claim 1, wherein the angle made by one track-width defining face of one of said core halves and the opposing track-width defining face of another core half is in a range of from 100° to 180°.

4. A magnetic head as set forth in claim 2, wherein the angle made by one track-width defining face of one of said core halves and an opposing track-width defining face of another said core half is in a range of from 100° to 180°.

5. A magnetic head as set forth in claim 3, wherein the angle made by one track-width defining face of each of said core halves and the <100> direction of said single-crystal ferrite is not more than 50°.

6. A magnetic head as set forth in claim 4, wherein the angle made by one track-width defining face of each of said core halves and the <100> direction of said single-crystal ferrite is not more than 50°.

\* \* \* \* \*